United States Patent
Blach (10) Patent No.: US 7,284,897 B2
(45) Date of Patent: Oct. 23, 2007

(54) EXTRUDER FOR CONTINUOUSLY WORKING AND/OR PROCESSING FLOWABLE MATERIALS

(75) Inventor: Josef A. Blach, Lauffen (DE)

(73) Assignee: Blach Verwaltungs GmbH & Co. KG, Lauffen (DE)

( * ) Notice: Subject to any disclaimer, the term of this patent is extended or adjusted under 35 U.S.C. 154(b) by 332 days.

(21) Appl. No.: 10/503,144

(22) PCT Filed: May 14, 2003

(86) PCT No.: PCT/EP03/05072

§ 371 (c)(1),
(2), (4) Date: Jul. 30, 2004

(87) PCT Pub. No.: WO2004/009327

PCT Pub. Date: Jan. 29, 2004

(65) Prior Publication Data

US 2005/0089595 A1    Apr. 28, 2005

(30) Foreign Application Priority Data

Jul. 22, 2002  (DE) .................. 102 33 214

(51) Int. Cl.
*B29B 7/48*  (2006.01)
*B29C 47/42*  (2006.01)

(52) U.S. Cl. .................. 366/75; 366/76.3; 366/80; 366/82; 366/85

(58) Field of Classification Search ...... 366/76.3–76.4, 366/75, 80, 82, 83–85, 88–91, 297–301, 366/76.9; 425/204, 208, 209
See application file for complete search history.

(56) References Cited

U.S. PATENT DOCUMENTS

| 1,356,296 | A | * | 10/1920 | La Casse | 366/76.4 |
|---|---|---|---|---|---|
| 2,550,226 | A | * | 4/1951 | Colombo | 366/85 |
| 2,563,396 | A | * | 8/1951 | Colombo | 425/204 |
| 2,581,451 | A | * | 1/1952 | Sennet | 366/85 |
| 2,802,238 | A | * | 8/1957 | Colombo | 366/85 |
| 2,942,294 | A | * | 6/1960 | Reifenhauser | 425/204 |
| 2,968,836 | A | * | 1/1961 | Colombo | 366/75 |
| 3,043,480 | A | * | 7/1962 | Wittrock | 222/146.5 |
| 3,310,837 | A | * | 3/1967 | Wittrock | 366/76.1 |

(Continued)

FOREIGN PATENT DOCUMENTS

DE          813 154          9/1951

(Continued)

OTHER PUBLICATIONS

International Search Report mailed Sep. 24, 2003 in PCT International Application No. PCT/EP03/05072 (3 pages).

*Primary Examiner*—Charles E. Cooley
(74) *Attorney, Agent, or Firm*—Flynn, Thiel, Boutell & Tanis, P.C.

(57) ABSTRACT

An extruder has at least three parallel, co-rotating shafts disposed in a cavity therein along a circle. The shafts are equipped with screw elements closely intermeshing over their whole circumference. At least one screw element is formed as a passage screw element with recesses in the screw crest, screw core and/or screw flank. Downstream of a supply port an element is provided for inhibiting the product flow in the flight of the passage screw element. A degassing opening is located downstream and adjacent the inhibiting element.

22 Claims, 12 Drawing Sheets

U.S. PATENT DOCUMENTS

| | | | | |
|---|---|---|---|---|
| 3,382,536 | A * | 5/1968 | Fritsch et al. | 366/82 |
| 3,640,669 | A * | 2/1972 | Hanslik | 425/376.1 |
| 3,704,866 | A * | 12/1972 | Mosher et al. | 366/80 |
| 3,746,319 | A * | 7/1973 | Blach | 366/81 |
| 3,825,236 | A * | 7/1974 | Hussmann et al. | 366/76.1 |
| 3,929,322 | A * | 12/1975 | Hanslik | 366/85 |
| 4,176,967 | A * | 12/1979 | Brinkmann et al. | 366/83 |
| 4,192,617 | A * | 3/1980 | Spielhoff | 366/83 |
| 4,268,176 | A * | 5/1981 | Muller | 366/83 |
| 4,303,344 | A * | 12/1981 | Muller | 366/76.3 |
| 4,535,940 | A * | 8/1985 | Geng | 241/3 |
| 4,591,487 | A * | 5/1986 | Fritsch | 422/134 |
| 4,678,339 | A * | 7/1987 | Peiffer et al. | 366/76.93 |
| 4,686,088 | A * | 8/1987 | Fritsch | 422/135 |
| 4,773,654 | A * | 9/1988 | Fritsch | 277/348 |
| 4,889,430 | A * | 12/1989 | Mueller | 366/85 |
| 5,020,916 | A * | 6/1991 | Fritsch | 366/97 |
| 5,106,198 | A * | 4/1992 | Muller | 366/75 |
| 5,108,711 | A * | 4/1992 | Chszaniecki | 422/135 |
| 5,261,740 | A * | 11/1993 | Mosher et al. | 366/76.9 |
| 5,393,140 | A * | 2/1995 | Blach | 366/75 |
| 5,429,435 | A * | 7/1995 | Blach | 366/83 |
| 5,476,319 | A * | 12/1995 | Blach | 366/83 |
| 5,510,073 | A * | 4/1996 | Kaegi et al. | 264/211.23 |
| 5,603,564 | A * | 2/1997 | Zimmermann | 366/77 |
| 5,836,682 | A * | 11/1998 | Blach | 366/84 |
| 5,851,065 | A * | 12/1998 | Ikeda et al. | 366/76.6 |
| 5,909,958 | A * | 6/1999 | Rauwendaal | 366/76.2 |
| 6,062,719 | A * | 5/2000 | Busby et al. | 366/85 |
| 6,074,084 | A * | 6/2000 | Kolossow | 366/84 |
| 6,190,031 | B1 * | 2/2001 | Blach et al. | 366/75 |
| 6,196,711 | B1 * | 3/2001 | Blach et al. | 366/83 |
| 6,302,572 | B1 * | 10/2001 | Cox et al. | 366/75 |
| 6,838,496 | B1 * | 1/2005 | Goedicke et al. | 523/343 |
| 7,025,491 | B2 * | 4/2006 | Blach et al. | 366/85 |
| 7,040,798 | B2 * | 5/2006 | Innerebner et al. | 366/76.3 |
| 7,080,935 | B2 * | 7/2006 | Innerebner et al. | 366/85 |
| 7,097,442 | B2 * | 8/2006 | Sawa | 425/204 |
| 2004/0027911 | A1 * | 2/2004 | Innerebner et al. | 366/85 |
| 2004/0141405 | A1 * | 7/2004 | Blach et al. | 366/85 |
| 2005/0001350 | A1 * | 1/2005 | Innerebner et al. | 264/211.23 |
| 2005/0047267 | A1 * | 3/2005 | Gneuss et al. | 366/85 |
| 2005/0048156 | A1 * | 3/2005 | Sawa | 425/204 |
| 2005/0089595 | A1 * | 4/2005 | Blach | 425/208 |
| 2005/0105382 | A1 * | 5/2005 | Sturm et al. | 366/85 |

FOREIGN PATENT DOCUMENTS

| | | |
|---|---|---|
| DE | 28 54 207 | 6/1980 |
| DE | 4231232 C1 * | 8/1993 |
| DE | 196 22 582 | 8/1997 |
| DE | 10020646 C1 * | 2/2001 |
| DE | 102004052055 A1 * | 4/2006 |
| EP | 0 002 131 | 6/1982 |
| EP | 0 422 272 | 4/1991 |
| EP | 0 788 867 | 7/1999 |
| GB | 1 468 482 | 3/1977 |
| JP | 02-062222 | 3/1990 |
| WO | 97/31767 * | 9/1997 |
| WO | 02/38359 A1 * | 5/2002 |
| WO | WO 02/090087 | 11/2002 |
| WO | WO 03/020493 | 3/2003 |
| WO | 03/070442 A1 * | 8/2003 |
| WO | 2004/009326 A1 * | 1/2004 |
| WO | 2004/009327 * | 1/2004 |

* cited by examiner

EXTRUDER FOR CONTINUOUSLY WORKING AND/OR PROCESSING FLOWABLE MATERIALS

FIELD OF THE INVENTION

This invention relates to an extruder for continuously working and/or processing flowable materials having co-rotating shafts parallel to the extruder axis and disposed in a cavity of an extruder housing.

BACKGROUND OF THE INVENTION

In co-rotating twin-shaft extruders equipped with double-flighted intermeshing screws, the total material flow is divided in the process space, i.e. the cavity in the extruder housing, into three parallel product flows extending along the screws and the inside wall of the extruder housing. The ratio of inside housing circumference to process space length is about 1:1.5 to 1:5. In contrast, in an extruder with e.g. twelve co-rotating parallel shafts disposed along a circle, i.e. forming a ring, the material flow is distributed over twelve axis-parallel product flows, and the ratio of inside housing circumference to process space length is between 3:1 and 1:1.5. Such an extruder is characterized by a substantially greater circumference based on its length compared to a twin-shaft extruder. Since four times as many individual flows of equal size must be guided parallel to each other within the process space, both the process engineering conditions and the possibilities of advantageously exploiting them are greater in an extruder having at least three co-rotating shafts.

In screws closely intermeshing on the whole circumference, the axial profile of each flight is determined by three circles corresponding to the outside diameter of the screw, the screw core diameter and the center distance of the screws (cf. EP-B-0 002 131).

In an extruder having plural co-rotating parallel shafts, the total process space in the extruder housing is divided into an outside and an inside process space. The two spaces are separated only by a thin, dynamic gap which is required for compensating production tolerances so that the screw shafts are freely rotatable without touching each other. However, the closely intermeshing screws prevent material from passing from one process space to the other, at least in the case of solid or highly viscous materials. When such materials are supplied, only the outside process space is therefore filled through the supply port while the inside process space remains unused in the area of the supply port. Due to this feed restriction, only a fraction of the possible throughput is realized by this extruder.

According to EP-B-0 788 867, the supply port of the extruder in the ring of shafts therefore has at least one opening which is formed for example by replacing one screw element by a cylindrical sheath. This improves the exchange of material between the outside and inside process spaces but reduces the conveying properties in the area of the supply port.

The problem of the invention is to provide an extruder having at least three co-rotating shafts parallel to the extruder axis with maximum throughput.

SUMMARY OF THE INVENTION

An extruder having maximum throughput is obtained by the following embodiments.

To permit passage from one process space to the other, at least one screw element has recesses in the screw crest, screw core and/or on the screw flank. For this passage screw element to cause an exchange of material between the two process spaces, an element is moreover provided for inhibiting product flow in the flight of the passage screw element in the conveying direction of the extruder. The element inhibiting product flow in the flight of the passage screw element can be an element disposed directly downstream of the passage screw element in the conveying direction. The element can have any desired axial or transverse profile, whereby the individual points of the profile have a distance from the shaft axis that is between the screw core diameter and the outside screw diameter.

For example, the transverse profile of the element that inhibits product flow can correspond to the transverse profile of the screw elements, i.e. consist of three circular arcs corresponding to the outside screw diameter, the screw core diameter and the center distance of the screw elements, as described above.

In particular, the product flow inhibiting element can be a disk. The outside diameter of the disk can correspond to the outside screw diameter, or only to the screw core diameter, causing the disk to correspond rather to a ring. It has proved especially suitable to use a disk whose outside diameter corresponds to the center distance of two shafts.

The product flow inhibiting element can, for example, also be a screw element having a smaller conveying effect than the other screw elements, for example due to lower pitch.

An essential pressure increase on the passage screw element is moreover obtained by a backfeed screw element which can mesh with the passage screw element.

The passage screw element and the product flow inhibiting element can be formed integrally, including monolithically for example, by a ring on the passage screw element which corresponds to the abovementioned disk with the screw core diameter.

The element braking the axial flow in the screw channel thus leads to stationary product back flow and thus an elevated filling ratio on the passage screw element, resulting in elevated differential pressure and elevated residence time for radial exchange of material through the recess of the passage screw element from the inside to the outside process spaces and vice-versa.

The ring of shafts can be equipped with identical or different product flow inhibiting elements or passage screw elements. Also, a plurality of identical or different product flow inhibiting elements or passage screw elements can be disposed one after the other.

By equipping the screw shafts with different elements in the circumferential direction from shaft to shaft, one can also produce a differential pressure partially and adjust a different filling ratio in the small volume area selectively and firmly, in both the axial and radial directions.

At least with double-flighted screw elements, the length of the passage screw element should be at least one quarter of the outside screw diameter for the element to achieve the desired effect. If the extruder has only one supply port, the passage screw element is preferably provided in the area of the supply port. In particular, if the product flow inhibiting element downstream thereof has one or more disks with a diameter corresponding to the outside screw diameter, the inside process space can have on the inside an enlargement in the area of the disk to ensure product flow within the inside process space in the axial direction.

After the product flow inhibiting element, the screw channel is largely empty. Accordingly, it is advantageous to dispose a flow inhibiting element before a degassing opening of the extruder, thereby preventing material from exiting through the degassing opening.

If the extruder has a plurality of supply ports for different materials, it is further advantageous to dispose a product flow inhibiting element after the passage screw element between the supply ports, causing the material supplied through the first supply port to pass into the inside process space while keeping the outside process space largely empty for the material supplied through the following supply port.

The inventive extruder has at least three shafts disposed along a circular arc or circle within the cavity of the extruder housing. If a circle is formed, at least six shafts are generally present.

BRIEF DESCRIPTION OF THE DRAWINGS

In the following the inventive extruder will be explained in more detail by way of example with reference to the drawings, in which.

DETAILED DESCRIPTION

Figure 1A:
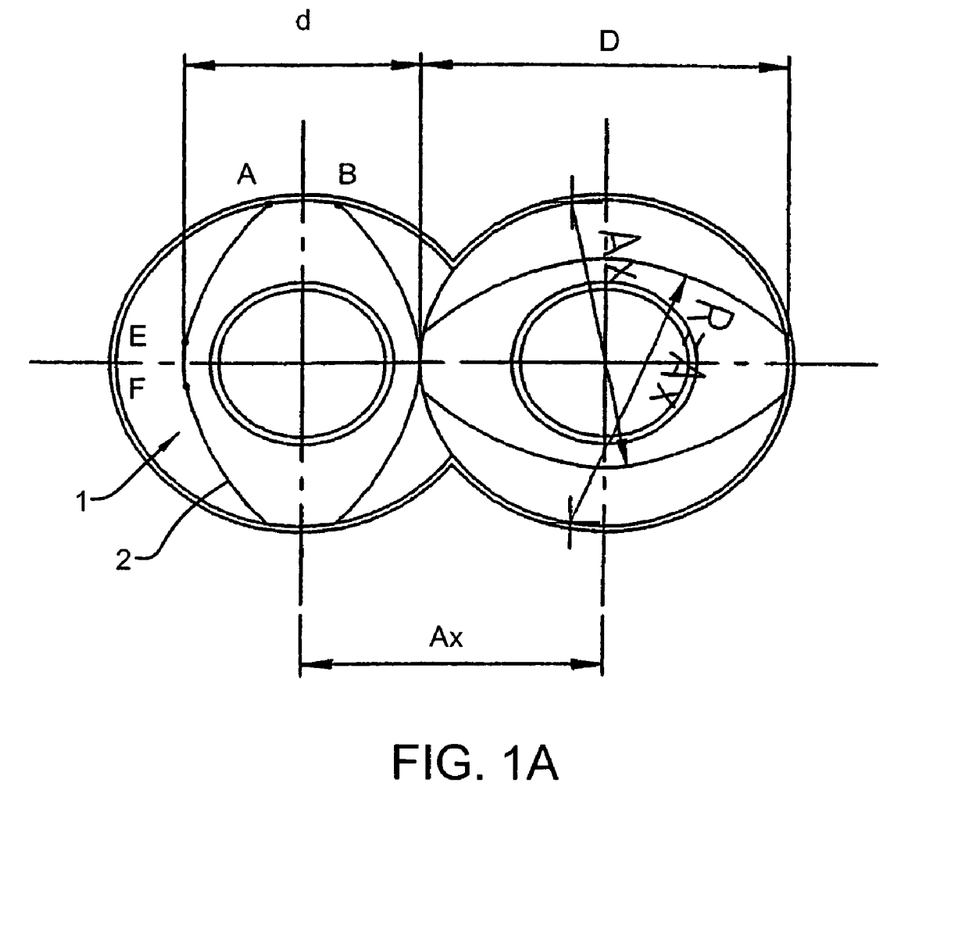
FIG. 1A shows the transverse profile of two screw elements closely intermeshing on the whole circumference.

According to FIG. 1A, screw elements 1 have a transverse profile 2 composed of three circular arcs A-B, E-F and A-E. Circular arc A-B has a diameter corresponding to outside screw diameter D, circular arc E-F has a diameter corresponding to screw core diameter d, and circular arc A-E has a diameter whose radius corresponds to center distance Ax of the two screw elements 1.

Figure 1B:
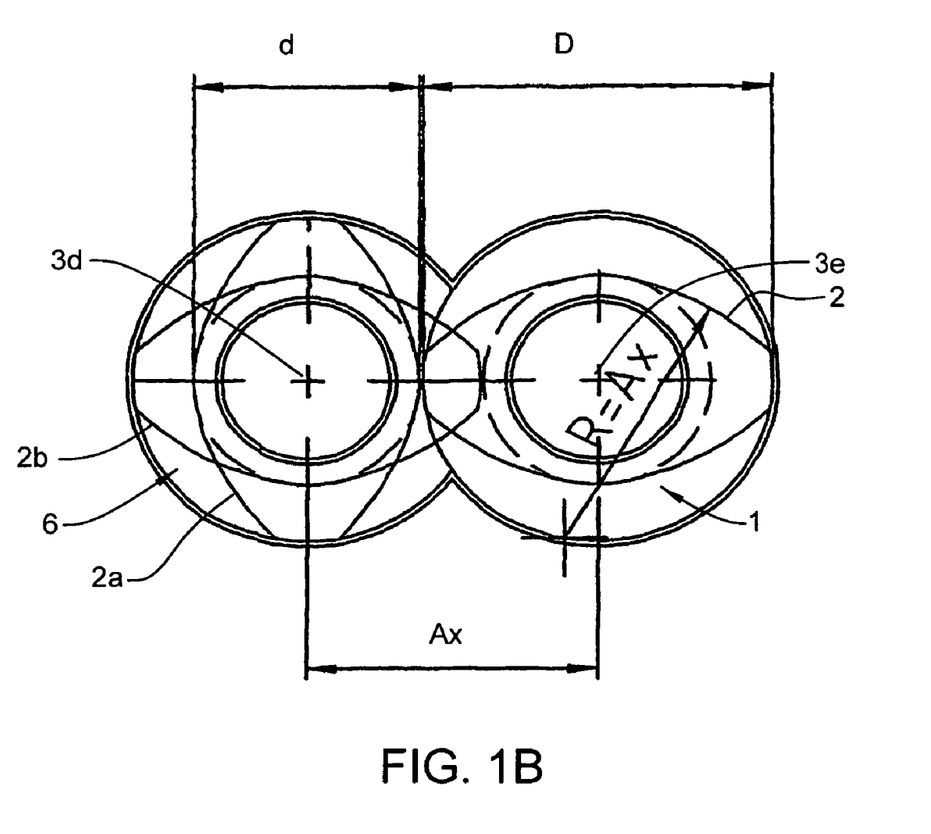
FIG. 1B shows the transverse profile of two closely intermeshing elements, namely, a screw element, and a passage screw element formed by stock removal on the screw crest and the screw flank.

FIG. 1B shows a transverse profile 2 of screw element 1 that is in close mesh with profile 2a of passage screw element 6 having the two screw profiles 2a and 2b offset by 90°, as explained in more detail below in FIG. 2.

Figure 2:
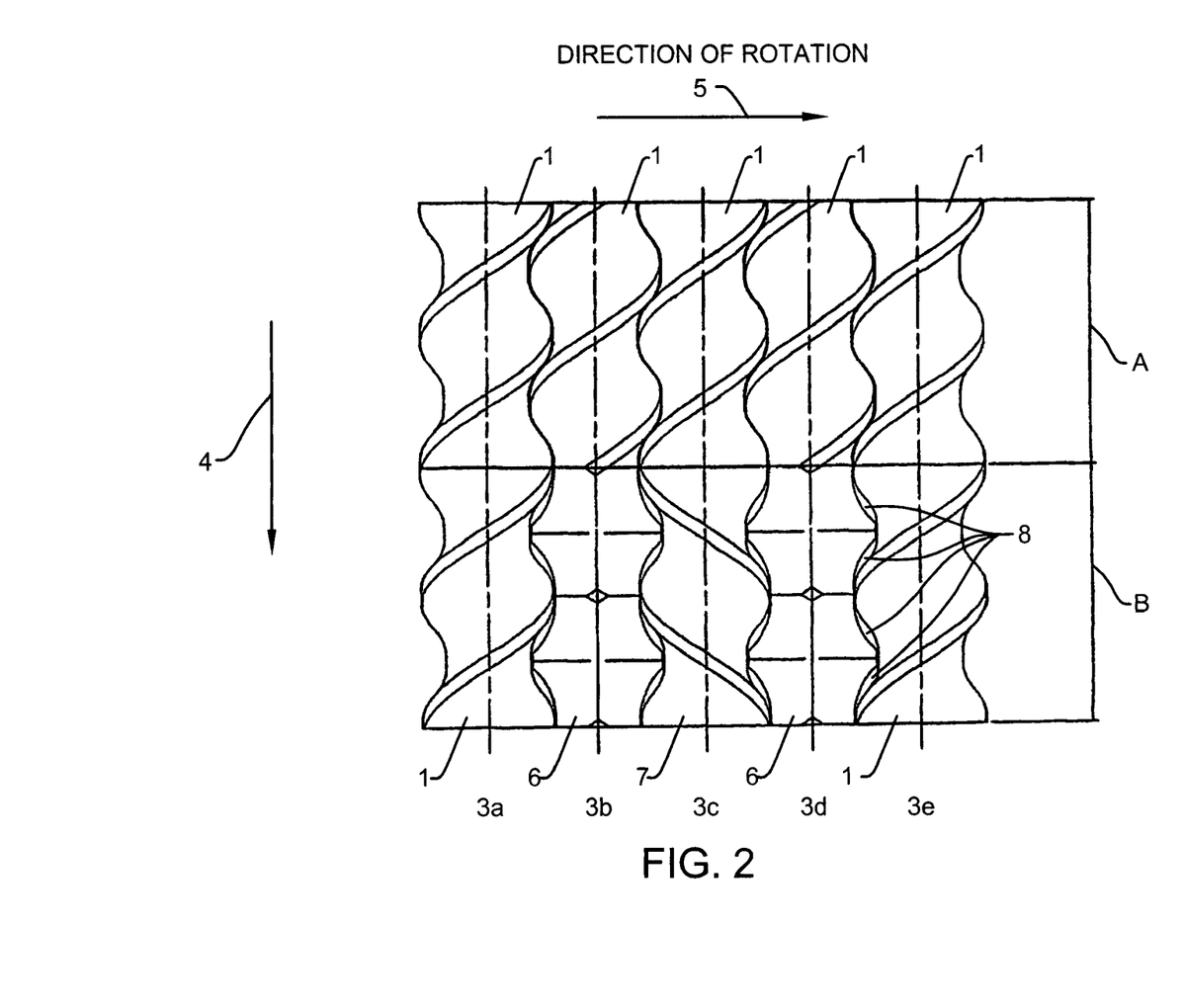
FIG. 2 shows a plan view of four side-by-side shafts equipped with screw elements and a passage screw element.

Accordingly, FIG. 2 shows five screw shafts 3a to 3e driven in the same direction, in a plane for clarity's sake. The conveying direction of the extruder is designated with arrow 4, and the direction of rotation of screw shafts 3a to 3e with arrow 5. Screw elements 1 on shafts 3a and 3e thus convey in direction 4 both in area A and in area B, while screw elements 1 conveying only in area A are provided on shafts 3b, 3c and 3d. Shaft 3c is equipped in area B with a product flow inhibiting element, namely backfeed screw element 7. Shafts 3b and 3d are equipped in area B with one passage screw element 6 each, formed from screw elements 1 in which stock removal 8 was effected on the screw crest and the screw flank, leaving remains of the screw crest that are rhombic in a plan view according to FIG. 2.

Screw elements 1 in portion A intermesh closely on the whole circumference. In portion B, backfeed screw element 7 forms a stationary product back flow, thereby producing an elevated filling ratio in the area of recesses 8 and causing the material to be urged radially through the recesses 8.

According to FIGS. 3A to 5, the extruder has cavity 11 in housing 10 in which twelve shafts 3 parallel to extruder axis 12 are disposed along a circle path 13 with the same central angle and driven in the same direction by drive unit 14.

Shafts 3 are equipped with elements consisting partly of conveying screw elements 1 closely intermeshing over their whole circumference, whose transverse profile is shown in FIG. 1.

Axial inside core 15 is disposed in extruder housing 10. On the axially inner side, i.e. on inside core 15, and on the axially outer side, i.e. on the inside of housing 10, there are concave circular segments 16, 17 (FIG. 5) on which screw elements 1 are guided tightly.

Figure 3A:
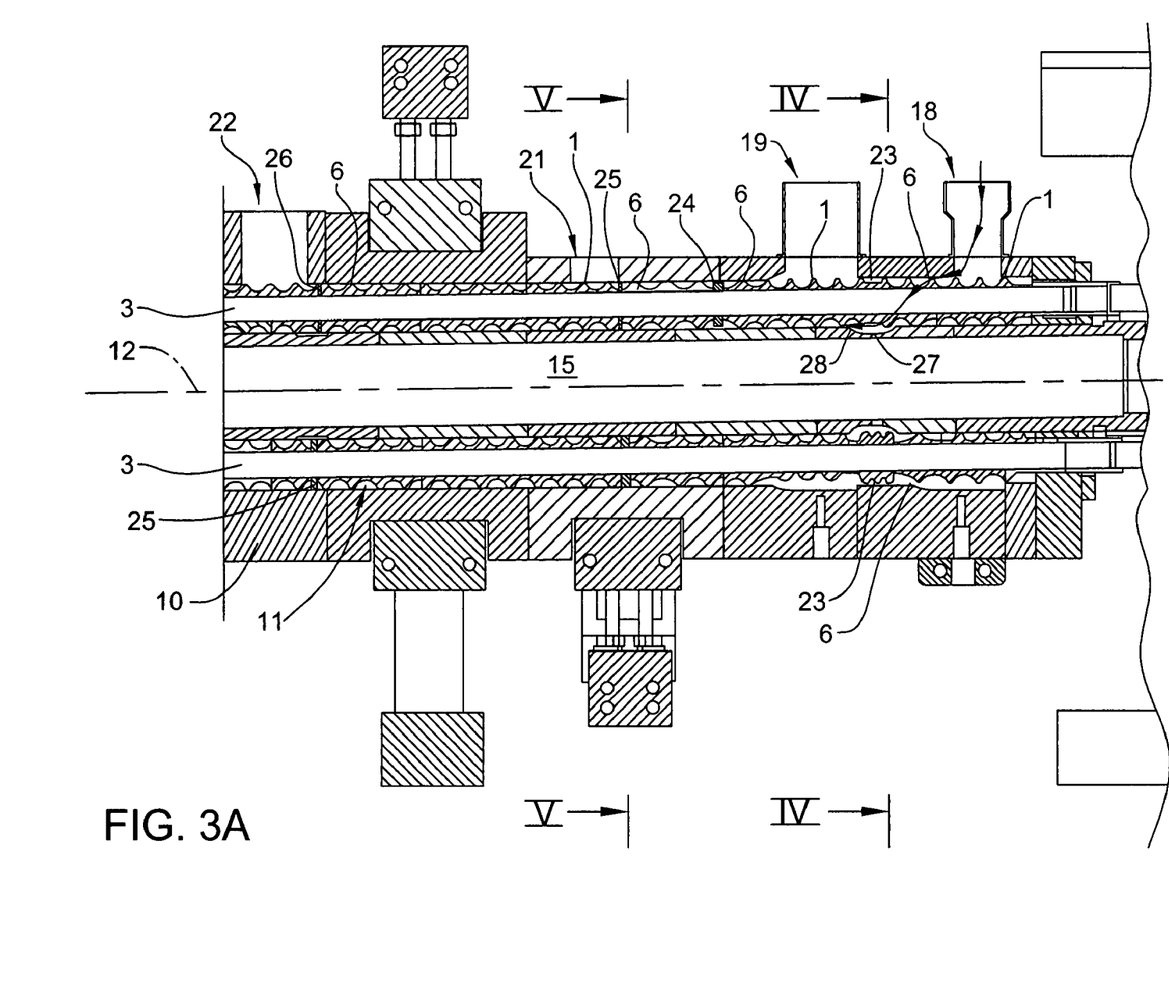
FIG. 3A shows a partial view of a longitudinal section through a first embodiment of the extruder.
Figure 3B:
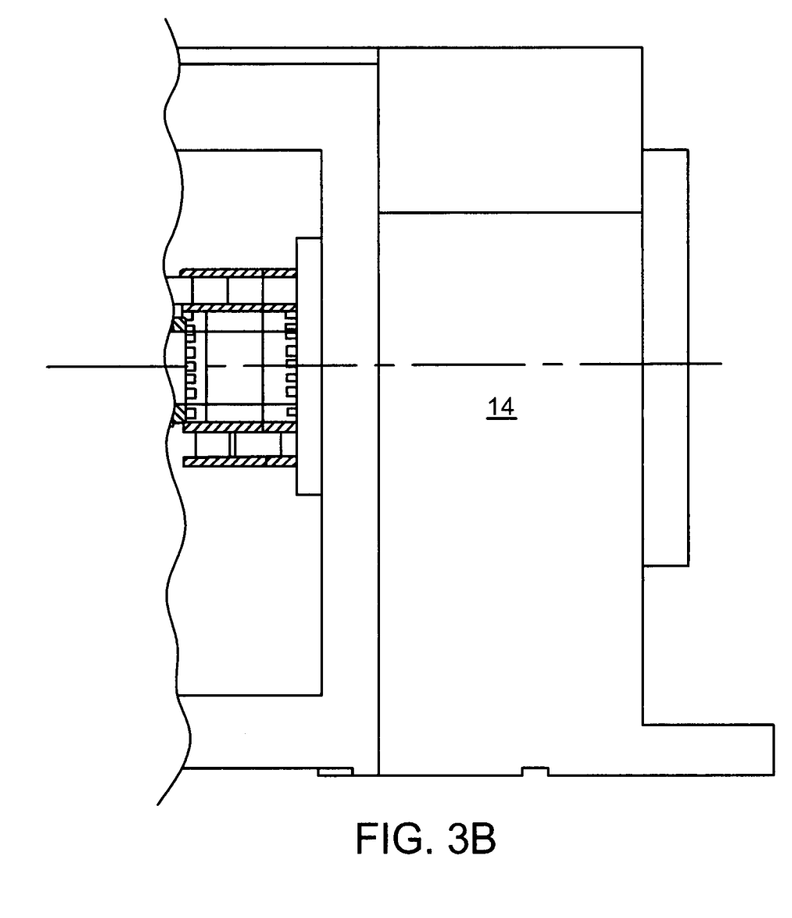
FIG. 3B shows the remaining partial view of the longitudinal section for the extruder of FIG. 3A.
Figure 4:
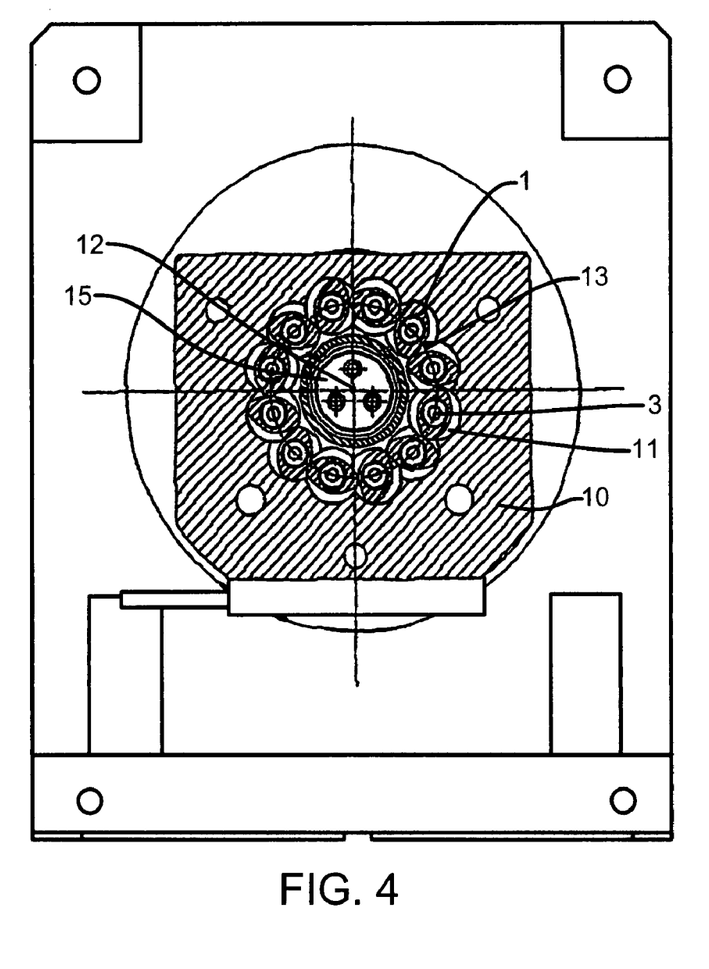
FIGS. 4 and 5 show sections along lines IV-IV and V-V in FIG. 3A.

On one axial end facing drive unit 14, extruder 2 has supply ports 18, 19 leading into cavity 11. Housing 10 is further provided with two degassing openings 21, 22. On the other axial end (not shown) of the extruder there is the discharge opening for the processed product.

Shaft 3 shown on the top in FIG. 3A and adjacent to supply ports 18, 19 and degassing openings 21, 22 has, from drive unit 14 (FIG. 3B) one after the other in conveying direction 4, screw element 1 at supply port 18, and corresponding passage screw element 6 according to FIG. 2. Disposed directly after passage screw element 6 is product flow inhibiting element 23 in the form of a plurality of disks with a diameter corresponding to the outside screw diameter, followed by conveying screw element 1 in the area of second supply port 19. After supply port 19 and passage screw element 6, there is disposed a product flow inhibiting element in the form of disk 24 with a diameter that is between the outside screw diameter and the screw core diameter. Passage screw element 6 follows the disk 24 and disposed thereafter is disk 25 with a diameter corresponding to the outside screw diameter before degassing opening 21, along with conveying screw element 1 in the area of degassing opening 21, etc. Mention should also be made of passage screw element 6 corresponding to FIG. 2, and disposed directly thereafter ring 26 as a product flow inhibiting element before second degassing opening 22.

The elements shown on the lower shaft in FIG. 3A correspond substantially to the elements shown on upper shaft 1 except that, instead of ring 26, disk 25 with a diameter corresponding to the outside screw diameter is provided before the second degassing opening.

FIG. 3A indicates that cavity 11 or inside core 15 has enlargement or recess 27 in the area of product flow inhibiting element 23 consisting of a plurality of disks with a diameter corresponding to the outside screw diameter. Material supplied through supply port 18 according to arrow 28 and flowing on passage screw element 6 from the outside process space to the inside process space is thus guided past product flow inhibiting element 23 axially within the inside process space.

Figure 5:
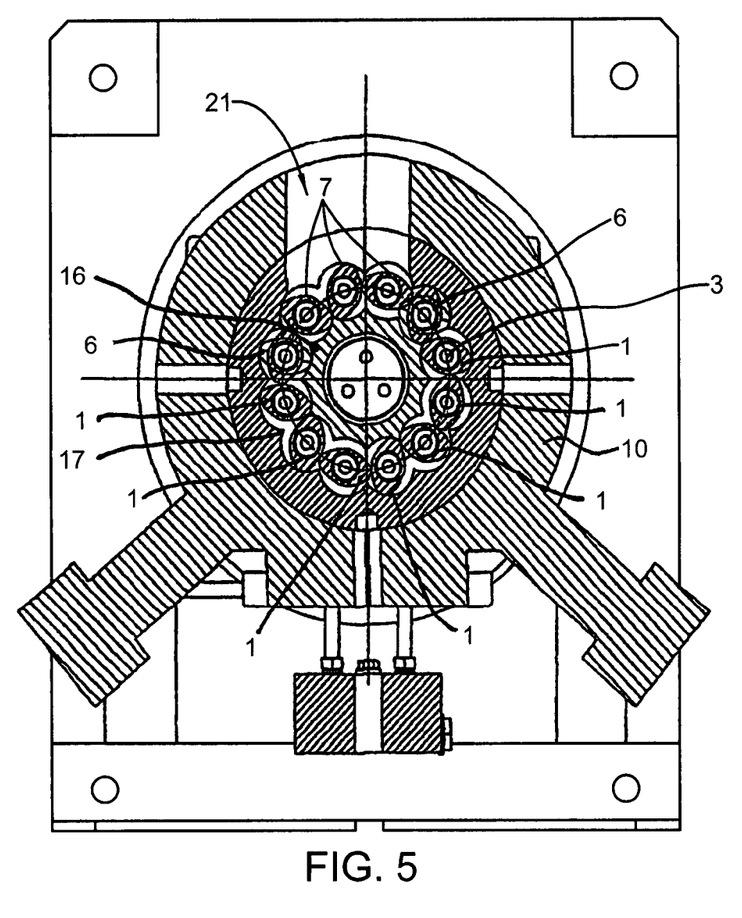

According to FIG. 5, two passage screw elements 6 are disposed at a distance directly before degassing opening 21, and three backfeed screw elements 7 between passage screw elements 6 on the upper side facing degassing opening 21, and seven conveying screw elements 1 on the lower side facing away from degassing opening 21 between passage screw elements 6. Conveying elements are then provided in circle 13 directly below the degassing opening.

The embodiment according to FIGS. 6A to 8 differs from that according to FIGS. 3A to 5 in that only one supply port 18 is provided. In the area of supply port 18, upper and lower shafts 3 are equipped with passage screw element 6, which is followed on upper shaft 3 by backfeed screw element 7 and on lower shaft 3 by product flow inhibiting element 23 consisting of a plurality of disks.

Figure 6A:
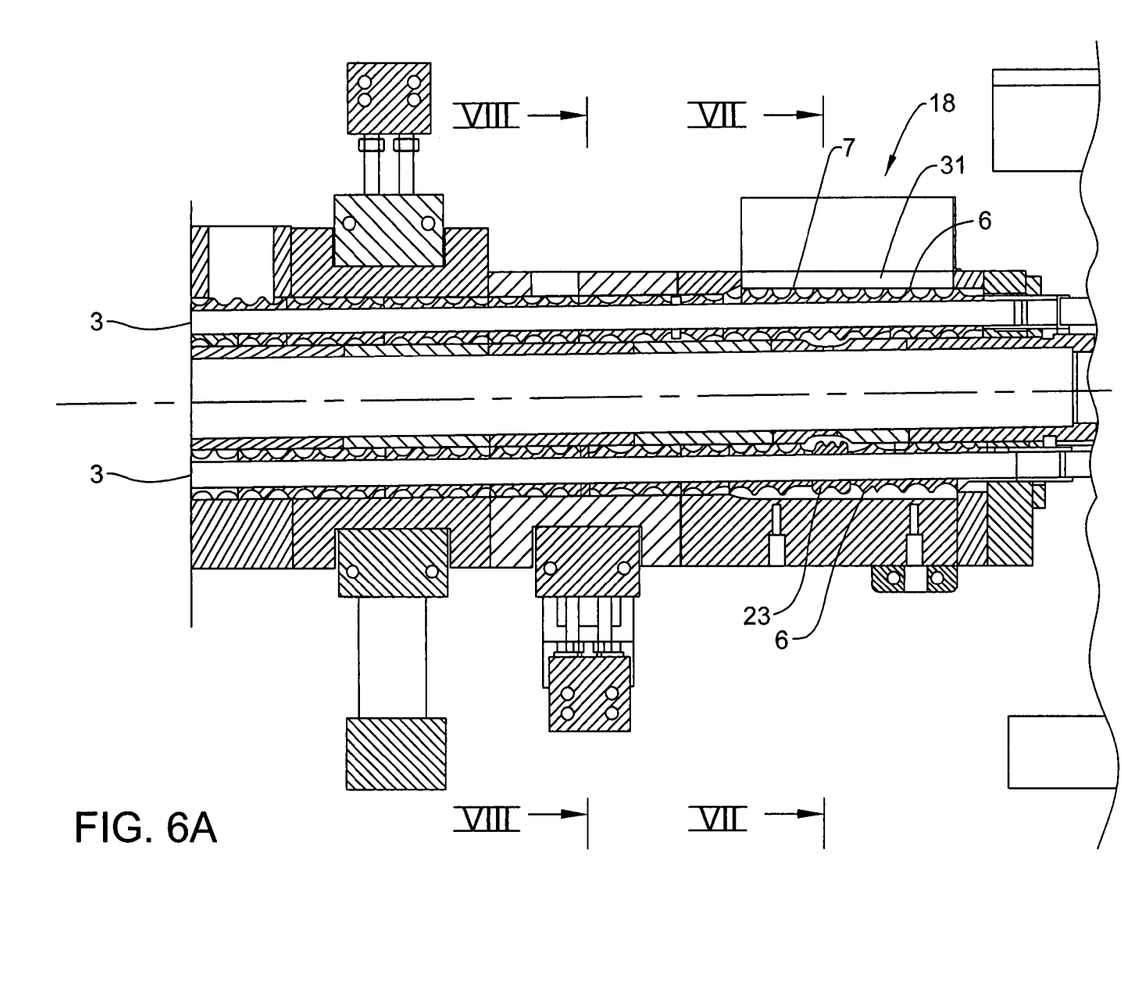
FIG. 6A shows a partial view of a longitudinal section through a second embodiment of the extruder.
Figure 6B:
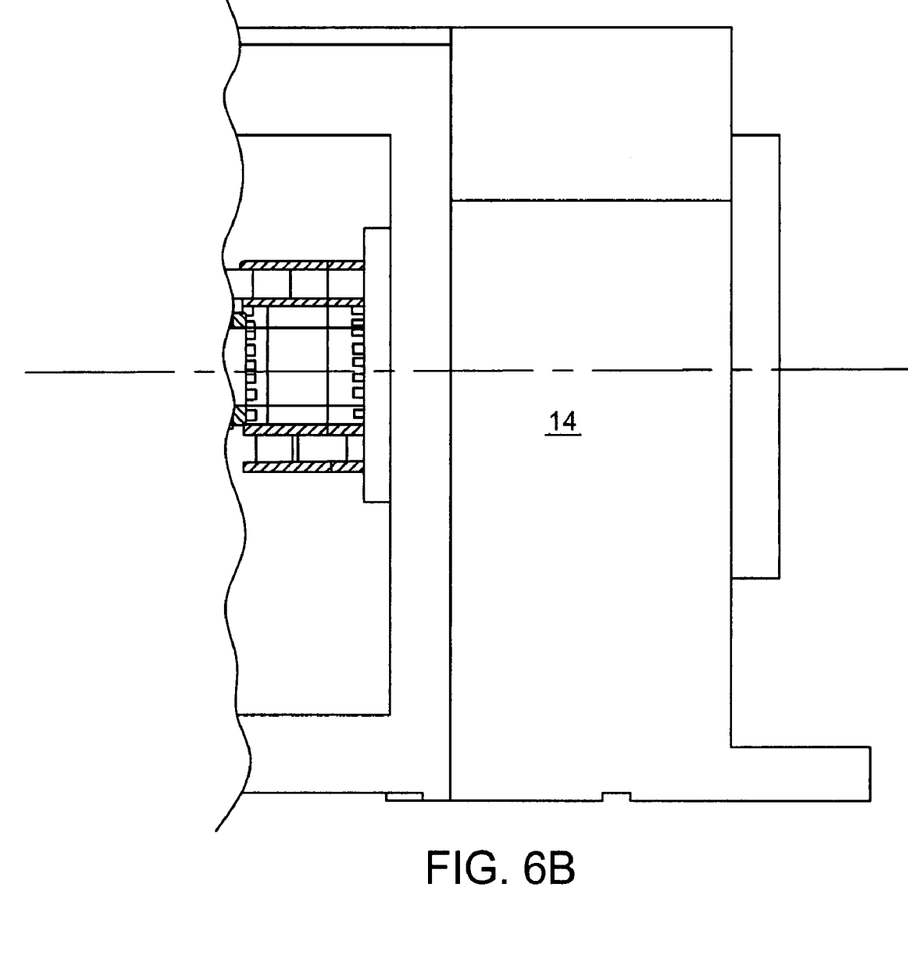
FIG. 6B shows the remaining partial view of a longitudinal section for the extruder of FIG. 6A.
Figure 7:
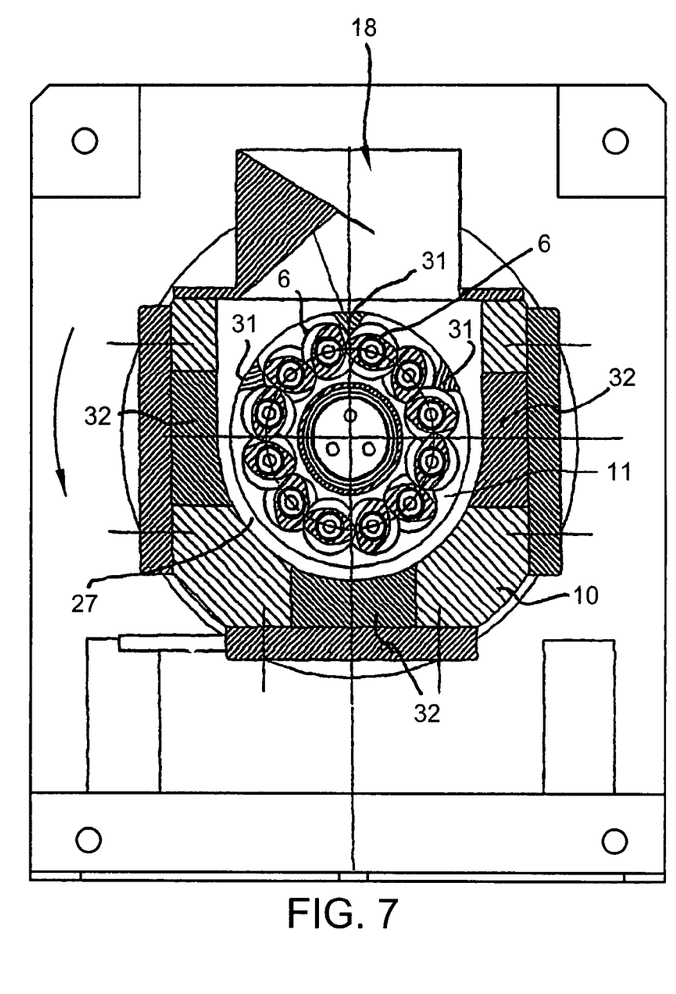
FIG. 7 and FIG. 8 show sections along lines VII-VII and VIII-VIII in FIG. 6A.
Figure 8:
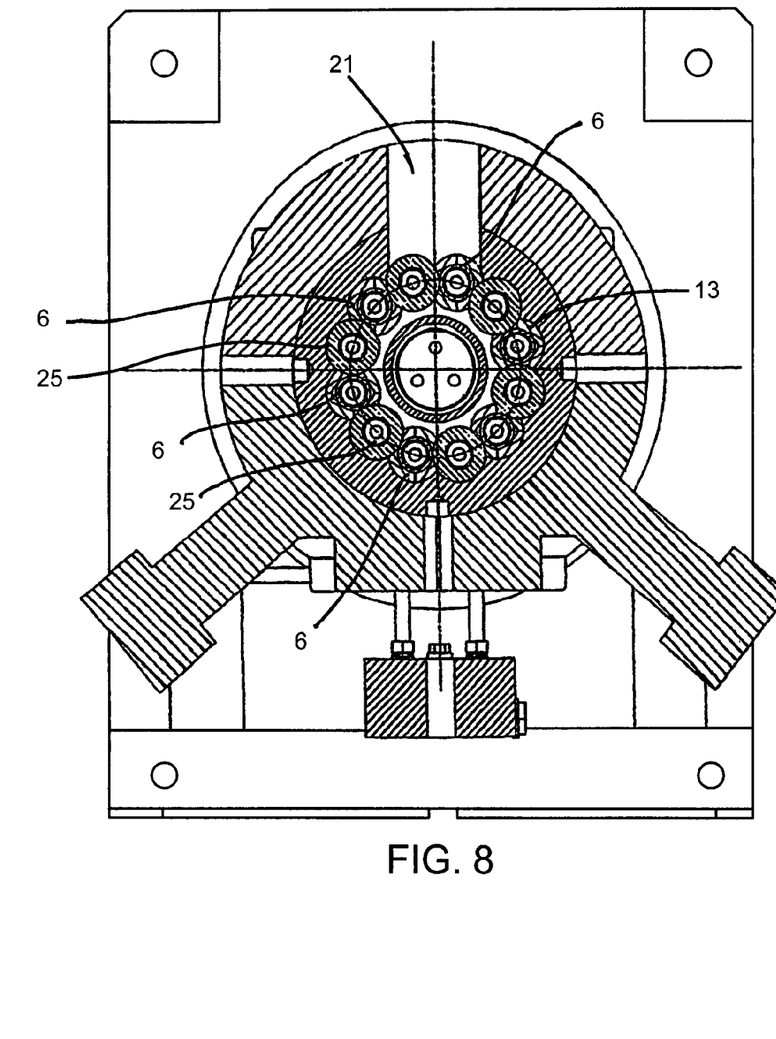

According to FIGS. 6A, 6B and 7, cavity 11 has in the area of supply port 18 on its outer side an enlargement formed by corresponding recess 27 on the inside wall of housing 10 to obtain a feed of material distributed over the circumference of the ring of shafts.

To improve the distribution of material to be fed, three longitudinal ribs 31 parallel to extruder axis 12 are provided on the side of shafts 3 facing supply port 18 and can also engage between screw elements 1 of two shafts 3. To permit the contour of cavity 11 to be varied in the area of enlargement 27, i.e. supply port 18, fittings 32 are provided in extruder housing 10. Instead of the concave profile shown, fittings 32 can also have a convex, straight or other profile. Fittings 32 can also be used for supply, cleaning and the like. Passage screw elements 6 are provided alternately on degassing opening 21 according to FIG. 8, and disks 25 on shafts 3 therebetween downstream in each case as product flow inhibiting elements.

Figure 9:
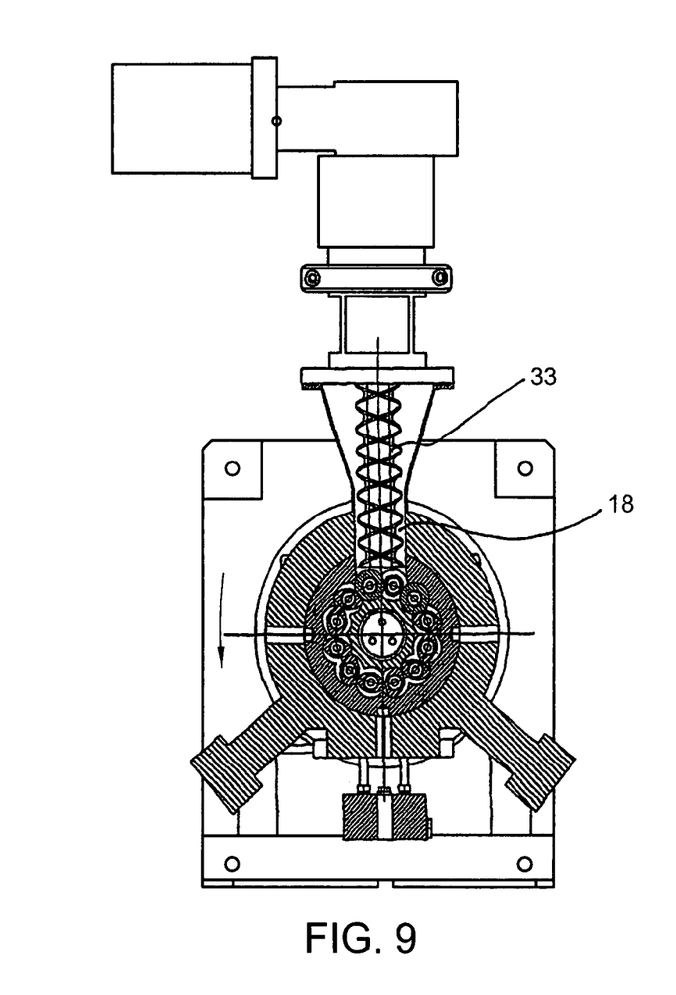
FIG. 9 shows a cross section through the extruder with a conveying screw on the supply port.

To fully utilize both the outside and the inside process spaces, conveying screw 33 is provided on supply port 18 according to FIG. 9 causing material to be urged into the process space. At the upper end of the funnel, supply or suction ports (not shown) are provided. Screw 33 serves as a supply device and, if no material is being supplied, as a retaining device.

The invention claimed is:

1. An extruder for continuously working and/or processing flowable materials having at least three co-rotating shafts parallel to the extruder axis and disposed in a cavity of an extruder housing along a circle with the same central-angle distance, said shafts being equipped with elements including closely intermeshing screw elements whose end face is limited by circular arcs corresponding to an outside screw diameter, a screw core diameter and maximally a center distance of the screw elements, the extruder housing being provided on radially inner and outer sides of the cavity with concave circular segments parallel to the extruder axis, on which the screw elements are tightly guided, and the extruder having at one end at least one supply port leading to the cavity, wherein at least one said screw element comprises a conveying screw element, a passage screw element on a first one of said shafts formed by stock removal on a screw crest, screw core and/or screw flank, and a product flow inhibiting element on the first one of said shafts and spaced axially from the passage screw element is provided for inhibiting product flow in the flight of the passage screw element.

2. An extruder according to claim 1, wherein the product flow inhibiting element has a transverse profile that is sized between the screw core diameter and the outside screw diameter.

3. An extruder according to claim 1, wherein the product flow inhibiting element comprises at least one disk.

4. An extruder according to claim 3, wherein the disk has a diameter that is between the screw core diameter and the outside screw diameter.

5. An extruder according to claim 3, wherein the disk has an outside diameter corresponding to the center distance of two shafts.

6. An extruder according to claim 1, wherein the product flow inhibiting element comprises a slow conveying screw element.

7. An extruder according to claim 1, wherein the product flow inhibiting element comprises a backfeed screw element.

8. An extruder according to claim 1, wherein the passage screw element and the product flow inhibiting element are monolithic or formed as separate parts.

9. An extruder according to claim 1, wherein the shafts are equipped with different passage screw elements and/or product flow inhibiting elements along the circle on which they are disposed in an axial section of the cavity.

10. An extruder according to claim 1, wherein at least one said passage screw element is provided in the area of the supply port.

11. An extruder according to claim 1, wherein a plurality of supply ports are provided and at least one said passage screw element is provided in the area between two said supply ports.

12. An extruder according to claim 1, including at least one degassing opening with said inhibiting element disposed axially upstream thereof to inhibit product flow.

13. An extruder according to claim 12, wherein at least one longitudinal rib parallel to the extruder axis is provided on the side of the extruder housing facing the supply port, the at least one longitudinal rib extending across the opening between the screw elements and the supply port.

14. An extruder according to claim 1, wherein the cavity has an enlargement in the area of the supply port on its outer side.

15. An extruder according to claim 14, wherein at least one fitting in the extruder housing is provided for changing the contour of the cavity in the area of the enlargement.

16. An extruder according to claim 1, including a retaining apparatus on the supply port for urging material into the cavity.

17. An extruder according to claim 16, wherein the retaining apparatus comprises a conveying screw.

18. An extruder for continuously working and/or processing flowable materials having at least three co-rotating shafts parallel to the extruder axis and disposed in a cavity of an extruder housing along a circle with the same central-angle distance, said shafts being equipped with elements including closely intermeshing screw elements whose end face is limited by circular arcs corresponding to an outside screw diameter, a screw core diameter and maximally a center distance of the screw elements, the extruder housing being provided on radially inner and outer sides of the cavity with concave circular segments parallel to the extruder axis, on which the screw elements are tightly guided, and the extruder having at one end at least one supply port leading to the cavity, wherein at least one said screw element comprises a passage screw element on a first one of said shafts formed by stock removal on a screw crest, screw core and/or screw flank, and a product flow inhibiting element on the first one of said shafts and spaced axially from the passage screw element is provided for inhibiting product flow in the flight of the passage screw element, wherein a plurality of different ones of said product flow inhibiting elements and/or said passage screw elements are disposed axially one after the other along the shaft, and wherein the cavity has an enlargement on its inner side in the area of the flow inhibiting element.

19. An extruder for continuously working and/or processing flowable materials comprising:

an extruder housing including a cavity therein defined in part by a cavity outer wall, the cavity outer wall comprising at least three outer wall concave circular segments;

an inner core disposed in the cavity and having at least three inner wall concave circular segments to define an inner cavity wall within the extruder housing, the cavity extending about the entirety of the inner core, wherein the inner wall concave circular segments and the outer wall concave circular segments form the cavity as a symmetric generally circular shaped cavity about a central longitudinal extruder axis of said inner core, said inner core having the same number of concave segments as the at least three concave circular segments of said extruder housing to form individual circular shaft receiving chambers within the cavity, each said circular shaft receiving chamber opening into adjacent ones of said circular shaft receiving chambers;

a co-rotating shaft centrally located in each said shaft receiving chamber, each said co-rotating shaft being spaced equidistantly from the extruder axis;

a first supply port extending radially through said extruder housing with an opening into said cavity of said extruder housing;

screw elements mounted to each of said shafts for advancing material from an input end of said extruder housing toward an output end of said extruder housing;

a drive unit connected to first ends of said shafts at the input end of said extruder housing to rotate said shafts at the same speed and in the same direction of rotation; and a degassing opening extending radially through said extruder housing and opening into said symmetric cavity, the degassing opening being spaced axially away from said input end of said extruder housing and said first supply port, at least one of said screw elements for advancing material from said input end toward the output end, comprising:

a conveying screw element radially adjacent said supply port;

a passage screw element axially adjacent said conveying screw element;

and a product flow inhibiting element axially adjacent and downstream of said passage screw element, said inhibiting element causing a backflow of the material to ensure that the material passes from one process space to another process space so that the entirety of the cavity is utilized to work and process flowable material.

20. The extruder of claim 19, including at least six of said inner wall concave segments, at least six of said outer wall concave segments, at least six of said co-rotating shafts, and at least six of said shaft receiving chambers, and wherein said shafts radially adjacent said degassing opening support additional back feed screw elements mounted thereon.

21. The extruder of claim 19, including longitudinal ribs located in said supply port opening and located above said screw elements to improve distribution of material fed into said extruder, and said inside core including a recess in the area of said product flow inhibiting element so that material within the process space is guided past the flow inhibiting element.

22. The extruder of claim 19, wherein said screw element adjacent the opening of the first supply port differs from axially adjacent ones of said screw elements.

\* \* \* \* \*